US011070276B2

(12) United States Patent
Bolin et al.

(10) Patent No.: US 11,070,276 B2
(45) Date of Patent: Jul. 20, 2021

(54) MESSAGE TRANSMISSION BASED ON A DETERMINED BEAM CONFIGURATION

(71) Applicant: SONY MOBILE COMMUNICATIONS INC., Tokyo (JP)

(72) Inventors: Thomas Bolin, Lund (SE); Olof Zander, Södra Sandby (SE); Basuki Priyanto, Lund (SE); Erik Bengtsson, Eslöv (SE); Zhinong Ying, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/483,319

(22) PCT Filed: Feb. 8, 2018

(86) PCT No.: PCT/EP2018/053186
§ 371 (c)(1),
(2) Date: Aug. 2, 2019

(87) PCT Pub. No.: WO2018/146198
PCT Pub. Date: Aug. 16, 2018

(65) Prior Publication Data
US 2019/0379439 A1    Dec. 12, 2019

(30) Foreign Application Priority Data
Feb. 9, 2017   (EP) .................................... 17155358

(51) Int. Cl.
*H04B 7/06* (2006.01)
(52) U.S. Cl.
CPC .......... *H04B 7/0691* (2013.01); *H04B 7/063* (2013.01); *H04B 7/0617* (2013.01)

(58) Field of Classification Search
CPC ..... H04B 7/0691; H04B 7/0617; H04B 7/063
See application file for complete search history.

(56) References Cited

U.S. PATENT DOCUMENTS

| 2001/0003443 | A1 | 6/2001 | Velazquez et al. |
| 2010/0165914 | A1 | 7/2010 | Cho et al. |
| 2010/0291957 | A1* | 11/2010 | Ozaki ............... H04W 72/0426 455/509 |
| 2011/0249588 | A1 | 10/2011 | Petersson et al. |

(Continued)

FOREIGN PATENT DOCUMENTS

| JP | 2010503365 A | 1/2010 |
| JP | 2012513151 A | 6/2012 |

(Continued)

OTHER PUBLICATIONS

International Search Report and Written Opinion of the International Searching Authority, International Application No. PCT/EP2018/053186, dated May 22, 2018, 13 pp.

(Continued)

*Primary Examiner* — David S Huang
(74) *Attorney, Agent, or Firm* — Myers Bigel, P.A.

(57) ABSTRACT

A first message is received, wherein the first message comprises information indicative of a spatial propagation characteristic of the first message. A beam configuration is determined based on the information. Then, a directed, beam-formed second message is transmitted using the beam configuration.

19 Claims, 7 Drawing Sheets

(56) References Cited

U.S. PATENT DOCUMENTS

2015/0349863 A1* 12/2015 El Ayach ............. H04B 7/0404
                                                            375/295
2017/0006539 A1    1/2017 Kakishima et al.
2017/0222693 A1    8/2017 Shen et al.

FOREIGN PATENT DOCUMENTS

| JP | 2015185955 A | 10/2015 |
|---|---|---|
| KR | 20140148229 A | 12/2014 |
| WO | 2016013608 A1 | 1/2016 |

OTHER PUBLICATIONS

Huawei et al., "Low frequency assisted high frequency on inital access", 3GPP TSG RAN WG1 Meeting #86b, R1-1609448, Lisbon, Portugal, Oct. 10-14, 2016, 5 pp.

Okvist et al., "15 GHz Propagation Properties Assessed with 5G Radio Access Prototype", 2015 IEEE 26th International Symposium on Personal, Indoor and Mobile Radio Communications—(PIMRC): Workshop on 5G Channel Measurement and Modeling, Hong Kong, Aug. 30-Sep. 2, 2015, pp. 2220-2224.

"Notice of Reasons for Refusal and English language translation", JP Application No. 2019-543049, dated Nov. 17, 2020, 17 pp.

"Notification of Reason for Refusal and English language translation", KR Application No. 10-2019-7026348, dated Dec. 4, 2020, 11 pp.

\* cited by examiner

MESSAGE TRANSMISSION BASED ON A DETERMINED BEAM CONFIGURATION

CROSS REFERENCE TO RELATED APPLICATIONS

This application is a 35 U.S.C. § 371 national stage application of PCT International Application No. PCT/EP2018/053186, filed on Feb. 8, 2018, which itself claims the benefit of and priority to European Patent Application No. 17155358.9, filed Feb. 9, 2017, the contents of both of which are incorporated herein by reference in their entireties. The above-referenced PCT International Application was published in the English language as International Publication No. WO 2018/146198 A1 on Aug. 16, 2018.

TECHNICAL FIELD

The present application generally refers to techniques of transmitting a message on a wireless link based on a determined beam configuration. In certain embodiments, the message is implemented by a beam-formed message to be used for high-frequency wireless transmission.

BACKGROUND

Beamforming techniques are becoming increasingly popular for wireless transmission. One advantage of beamforming is the compatibility with transmission on high carrier frequencies, e.g., above 6 GHz and even up to 60 GHz or beyond. Large bandwidths may be achieved. Another advantage of beamforming is the availability of spatial multiplexing, thereby increasing spectral efficiency.

Various applications of beamforming are envisioned in the Third Generation Partnership Project (3GPP) New Radio (NR) or 5G communication system.

Beamforming techniques may be based on synchronization of beam configurations between a transmitting device and a receiving device. Here, pilot signals may be transmitted on different beams; then channel sounding can be implemented based on the pilot signals of the different beams and the best beam can be selected based on the channel sounding. In another approach, synchronization signals may be transmitted on different beams; then beam sweeping operation can be implemented and the best beam can be selected based on the detected best synchronization signals.

For synchronizing the beam configurations between the transmitting device and the receiving device, different approaches are presently used. According to a first approach, the receiving device may initially use an omnidirectional receive beam configuration to account for an arbitrary orientation of the receiving device in space. This helps to ensure that pilot signals transmitted by the second device are received by the first device. When using an omnidirectional receive beam configuration, the accuracy of the synchronization of the beam configurations may be limited due to limited signal-to-noise of the omnidirectional reception, in particular at high frequencies.

According to a second approach, beam sweeping may be employed by the receiving device. Here, different receive beam configurations can be activated subsequently to successively implement sensitivity profiles of reception oriented differently in space. Such beam sweeping of the receiving device typically covers the entire surrounding of the receiving device for detecting pilot signals transmitted by the transmitting device. The beam sweep may take significant time and thus increase latency. Furthermore, such a beam sweeping procedure typically results in a high energy consumption which is particularly unfavorable in case the receiving device is a mobile, battery-based device.

SUMMARY

Therefore, it is an objective of the present application to provide a method and a respective device for transmitting a message on a wireless link which enables low-latency and energy-saving wireless communication.

A method and a device according to the independent claims are provided. Further embodiments are defined in the dependent claims.

According to an embodiment, a method is disclosed. The method comprises a first device receiving an at least one first message on a wireless link from a second device. The at least one first message comprises information indicative of a spatial propagation characteristic of the at least one first message. The method further comprises determining a beam configuration of a plurality of antennas of the first device based on the information. The method further comprises transmitting a directed, beam-formed second message on the wireless link using the beam configuration. For example, the second message may be transmitted to the second device or a third device.

Such techniques may be based on the finding that the first message received by the second device is not only provided for synchronizing beam configurations between the first and second devices using conventional channel sounding approaches based on pilot signals, but alternatively or additionally includes the information that may facilitate and/or improve determining the beam configuration for wireless communication between the first and second device.

According to another embodiment, a device comprises control circuitry. The control circuitry is adapted to receive at least one first message on a wireless link from a further device. The at least one first message comprises information indicative of a spatial propagation characteristic of the at least one first message. The control circuitry is further adapted to determine a beam configuration of a plurality of antennas of the device based on the information. The control circuitry is further adapted to transmit a directed, beam-formed second message on the wireless link to the further device and using the beam configuration.

The control circuitry of the device may hence be adapted to perform the above method.

A message within the meaning of the present disclosure may refer to any data object which comprises information and is adapted to convey said information from a first device to a second device. The message may be a logical data structure of a transmission protocol stack implemented on a wireless link. The message may be transmitted using a certain beam configuration, i.e., on a certain beam having a well-defined spatial propagation characteristic.

A wireless link within the meaning of the present disclosure may refer to a data connection implemented between two devices on a wireless transmission medium. The wireless transmission medium may enable the transmission of electromagnetic radiation from the first device to the second device. Modulated signals may be used to transmit messages, thereby encoding information. The wireless link may include one or more channels such as an uplink channel, a downlink channel, a data channel, a control channel, a sidelink channel, etc.

A device within the meaning of the present disclosure may be a user equipment or a base station or a relay.

Examples of user equipment include a smartphone, a handheld device, a telephone, a laptop, a tablet pc, a smart TV, a Internet of Things (IoT) sensor or actuator, etc.

A spatial propagation characteristic of a message within the meaning of the present disclosure may refer to the spatial arrangement or the path through space taken by a message on a wireless link. If a directed, beam-formed message is transmitted, the spatial propagation characteristic may be indicative of the orientation and/or origin of the corresponding beam.

In some examples, the beam configuration can be indicative of at least one antenna of a plurality of antennas. For example, a subset of all antennas available at the first device may be selected. For example, the beam configuration could be indicative of an antenna module (sometimes also referred to as antenna panel or patch). For example, it is possible that the first device includes multiple antenna modules; each antenna module can include a plurality of antennas. The antennas of a given antenna module can be used for phase-coherent transmission, as they may be electrically coupled with each other and arranged in an array. For example, different antenna modules may be arranged and/or oriented differently. For example, different antenna modules may be associated with different directivity. For example, different antenna modules may be arranged orthogonally with respect to each other. By selecting at least one antenna—e.g., by specifying a particular antenna module—it is possible to implement a coarse determining of the beam configuration; this may be because the selection of the antenna may already imply a certain directivity based on its spatial arrangement. Then, in a second step, antenna weights can be determined as beam configuration, in a fine adjustment step.

In some examples, the spatial propagation characteristic may be considered when determining the at least one antenna; and may or may not be considered when determining the antenna weights for the at least one antenna. For example, other strategies may be employed for determining the antenna weights for the at least one antenna, e.g., a codebook-based approach using transmit and receive beam sweeps.

A beam configuration may hence correspond to at least one antenna of a plurality of antennas which is selected for transmission.

A beam configuration may correspond to antenna weights of a plurality of antennas. The plurality of antennas may form an antenna array or multiple antenna arrays. The beam configuration may define amplitudes and phases with which the various antennas contribute to transmission and/or reception of signals. Non-contributing antennas may have a zero amplitude and phase.

For example, the beam configuration may be indicative of antenna weights of the selected at least one antenna; this may be helpful in a two-step approach where, first, coarse determining of the beam configuration by selection of at least one antenna is implemented and, second, fine determining of the beam configuration by determining of the antenna weights is implemented.

In such a scenario, it is possible that two or more first messages are communicated, e.g., one for the coarse determining and one of the fine determining.

A directed, beam-formed message may relate to a message transmitted using a certain beam configuration. The directed, beam-formed message may be transmitted using a non-omnidirectional propagation characteristic, i.e., may be transmitted on a certain beam. For example, a pencil-shaped beam may be employed for the directed, beam-formed message.

In an embodiment of the method, the information is indicative of a propagation direction of the first message. For example, the propagation direction may be defined in a global reference frame, e.g., World Geodetic System 1984 (WGS84).

In another embodiment, the information is indicative of at least one of an azimuth angle and an elevation angle of the propagation direction of the first message. For example, such angles may be defined in the global reference frame employed by the first device and the second device.

In another embodiment, the information is indicative of an elevation of the second device. For example, the elevation may be with respect to sea level or any other global reference frame such as WGS84.

In another embodiment, the information is indicative of a geolocation of the second device, e.g. latitude and longitude.

Based on the elevation and/or geolocation, it is possible to conclude on an origin of the first message, i.e., on the position of the second device. Based on the elevation and/or geolocation, it is possible to conclude on a relative position in space of the second device with respect to the first device. This facilitates to determine the beam configuration.

For example, it is expected that the geolocation of a base station is typically static. The geolocation of a mobile device will typically change due to the device mobility, e.g., on the orders of second, minutes or hours. The geolocation may be determined using GPS or any other position technique, e.g., Wi-Fi or Bluetooth positioning, time-difference of arrival positioning such as observed time difference of arrival (OTDOA), etc.

In another embodiment, the first message comprises further information which is indicative of a geolocation of a third device—e.g., a target base station or a relay—communicating with the second device. Thereby, the first message originating from the second device additionally provides information to the first device which refers to the geolocation of the third device communicating with the second device. The geolocation of the second device may be different from the geolocation of the third device. For example, the third device may be a further base station different from a base station implementing the second device. In another example, the third device may be a further user equipment, e.g., implementing relay functionality. Generally, the first device may receive geolocation information with respect to a plurality of potential communication partners—e.g., base stations, other mobile device, and/or relays—surrounding the first device. This may facilitate handovers between base stations and discovery of relays.

In another embodiment, the beam configuration is determined based on a comparison between a position of the first device and a position of the second device. Hence, the relative position of the second device with respect to the first device may be considered. The first device may calculate the propagation direction of the second message to be transmitted to the second device by the wireless link based on the comparison. This can be used to determine the beam configuration.

In another embodiment, the first device receives the first message using an omnidirectional receive beam configuration.

An omnidirectional configuration can correspond to a sensitivity which covers a comparably large solid angle. For example, substantially opposite directions may be associated with comparable sensitivities. For example, a sensitive angle may be not smaller than 100°, optionally not smaller than 120°, further optionally not smaller than 180°. For example, in contrast to a pencil-shaped beam, the omnidirectional configuration may cover a larger solid angle.

The information included in the at least one first message may be used to determine the beam configuration. In particular, it may not be required to determine the beam configuration based on a receive beam sweep implemented by the first device. This facilitates determining the beam configuration with low latency and using low energy consumption.

In another embodiment, the at least one first message is a directed, beam-formed message. This may facilitate receiving the at least one first message using a high signal-to-noise ratio due to spatial selectivity. For example, the second device may implement a beam sweep as part of which the at least one first message is transmitted.

In another embodiment, the method further comprises the first device a) receiving at least one further first message on the wireless link from the second device, the at least one further first message being a directed, beam-formed message, and b) comparing receive properties of the at least one first message and the at least one further first message, wherein the beam configuration is further determined based on said comparing of the receive properties.

For example, the first message and the at least one further first message may be transmitted as part of a common beam sweep implemented by the second device. Then, channel sounding may be employed to find the beam of the beam sweep which provides the largest signal-to-noise ratio. It would then be possible to rely on the information indicative of the spatial propagation characteristic of the message transmitted on the respective beam providing the largest signal-to-noise ratio when determining the beam configuration for transmitting the second message.

In another embodiment, said receiving the first message by the first device is during initial access of the first device to a network of the first device and the second device. Thereby, an accurate beam configuration may be achieved when the first device wakes up from idle mode and transitions to an active mode in which it is ready to receive data from the second device.

In another embodiment, the method further comprises monitoring at least one of the position and the orientation of the first device, and real-time adapting the beam configuration is based on said monitoring.

This may facilitate tracking relative movements and changes of orientation of the first device with respect to the second device. Therefore, synchronization of the beam configuration may be also maintained in the long run, even if at least one of the first and second device is used as a mobile device.

In another embodiment, the beam configuration is determined based on the assumption of a line-of-sight propagation of messages transmitted between the first device and the second device on the wireless link.

The assumption of line-of-sight propagation may simplify said determining of the beam configuration. For example, it may not be required to take into account reflections of the first message. For example, if the spatial propagation characteristic includes a propagation direction of the first message, it can be assumed that the origin of the first message—i.e., the second device—is positioned with respect to the first device at an orientation corresponding to the propagation direction. In particular, this may correspond to a scenario where it is assumed that the propagation direction is the same at the transmitting second device and the receiving first device.

In another embodiment, the first message encodes the information using a first constellation and the second message encodes further information using a second constellation, wherein the first constellation is lower than the second constellation.

Thereby, reliable decoding of the information included in the first message is facilitated even though a beam synchronization between the first device and the second device has not yet been achieved. This is because lower constellations typically facilitate robust decoding even in presence of noise or interference on the wireless link.

A method comprises a second device transmitting at least one first message on a wireless link. The at least one first message is transmitted to a first device. The at least one first message comprises information indicative of a spatial propagation characteristic of the at least one first message. The second device receives a directed, beam-formed second message on the wireless link from the first device.

A device comprises control circuitry adapted to transmit at least one first message on a wireless link to a further device. The at least one first message comprises information indicative of a spatial propagation characteristic of the at least one first message. The control circuitry is further adapted to receive a directed, beam-formed second message on the wireless link from the first device.

The above summary is merely intended to give a short overview over some features of some embodiments and implementations and is not to be construed as limiting. Other embodiments may comprise other features than the ones explained above.

BRIEF DESCRIPTION OF THE DRAWINGS

The above and other elements, features, steps and characteristics of the present disclosure will be more apparent from the following detailed description of embodiments with reference to the following figures.

DETAILED DESCRIPTION OF THE DRAWINGS

Figure 1:
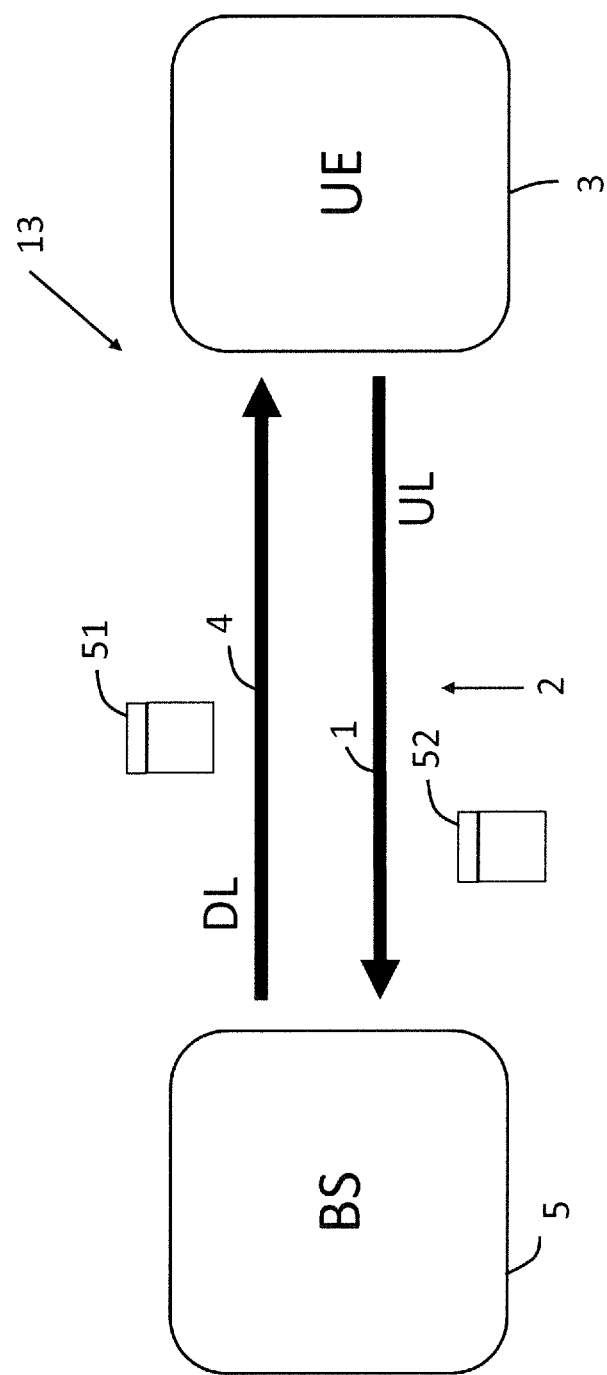
FIG. 1 schematically illustrates a network comprising a wireless link between a base station and a user equipment according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network comprising multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wide-band Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques disclosed herein may facilitate beamforming. In particular, the techniques disclosed herein may facilitate beamforming by determining a beam configuration of a plurality of antennas of a device and transmitting a directed, beam-formed message based on the determined beam configuration. The techniques described herein may facilitate determining the beam configuration at high accuracy and/or low latency.

The beam configuration may be indicative of phase shifts and/or gain settings and/or other precoding properties for each one of a plurality of antennas.

A wireless link for transmitting and receiving messages may be implemented on high frequencies, e.g., above 6 GHz or 10 GHz or even above 50 GHz.

Various examples disclosed herein are based on the finding that line-of-sight propagation of message can be a valid assumption for such high frequencies. In this context, Ökvist et al. (P. Ökvist, H. Asplund, A. Simonsson, B. Halvarsson, J. Medbo, N. Seifi, "15 *GHz Propagation Properties Assessed with 5G Radio Access Prototype*", 2015 IEEE 26th Annual International Symposium on Personal, Indoor, and Mobile Radio Communications (PIMRC), p. 2220-2224) presented coverage and penetration loss measurements in an urban environment at 15 GHz which depicts a significant loss of signal strength when passing around a corner of a building. Thus, in one embodiment the present application assumes line-of-sight propagation of messages transmitted between the devices on the wireless link when determining the beam configuration.

By using the beam configuration, a well-defined spatial profile of a wireless transmission may be obtained, typically referred to as a beam. The beam may thus define a directivity of transmitting and/or receiving a message and may correspond to a spatial propagation path. Here, a transmit beam configuration may be employed for transmitting a message and a receive beam configuration may be employed for receiving a message. The spatial profile may define a certain width and amplitude of the beam. The spatial profile may define side lobes which may be suppressed if compared to a central peak of the beam.

FIG. 1 schematically illustrates a wireless communication network 13 that may benefit from the techniques disclosed herein. The network 13 may be a 3GPP-standardized network such as 3G, 4G, or upcoming 5G. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 13 includes a user equipment (UE) 3 and a base station (BS) 5. As an example, such a UE 3 might be one of the following: a smartphone; a cellular phone; a table; a notebook; a computer; a smart TV; an MTC device; an eMTC device; an IoT device; an NB-IoT device; a sensor; an actuator; etc. BS 5 might also be one of the following: a Node-B (NB); an evolved Node-B (e-NB); an gNB as in NR; etc.

A wireless link 2 is established between the UE 3 and the BS 5. The wireless link 2 may implement a downlink (DL) channel 4. The DL channel 4 can be used for transmitting a message 51 from the BS 5 towards the UE 3. The wireless link 2 may also implement an uplink (UL) channel 1 for transmitting a message 52 from the UE 3 towards the BS 5.

Figure 2:
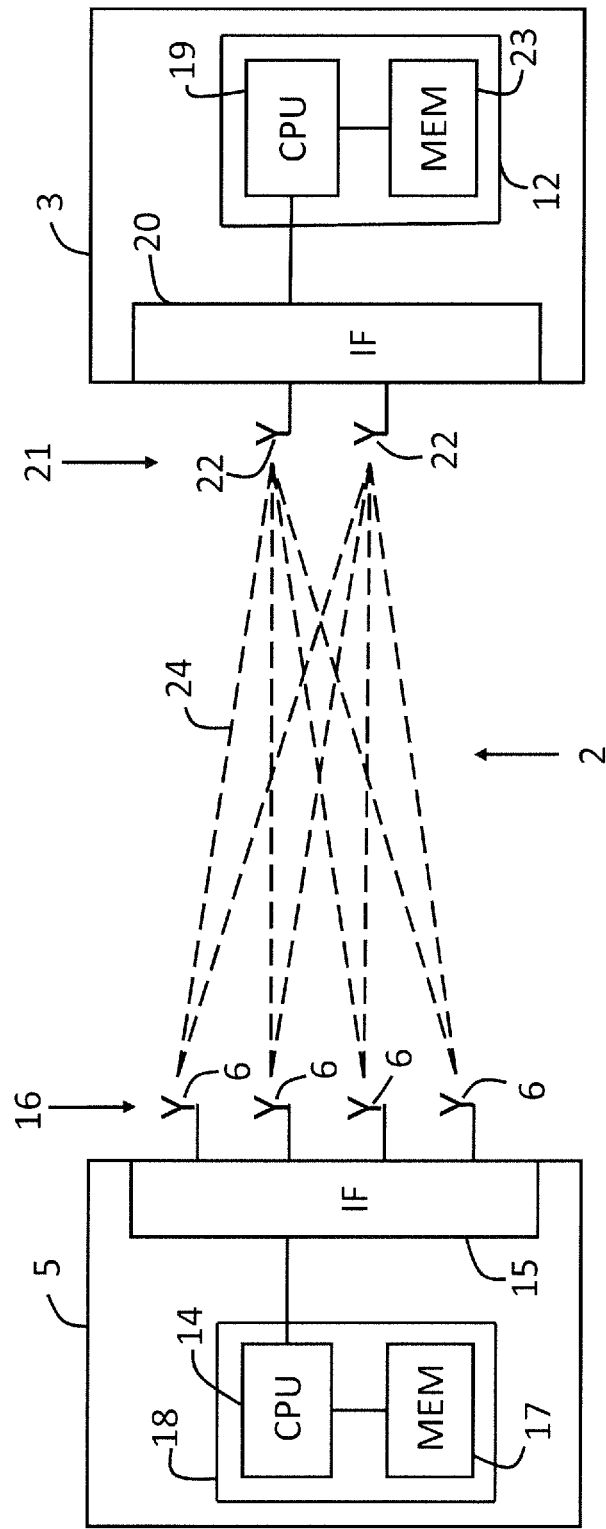
FIG. 2 schematically illustrates the base station and the user equipment in greater detail according to various examples.

FIG. 2 schematically illustrates the BS 5 and UE 3 in greater detail. The BS 5 includes a processor 14 and an interface 15, sometimes also referred to as frontend. The interface 15 is coupled via antenna ports with an antenna array 16 including a plurality of antennas 6. In some examples, the BS 5 may include a plurality of antenna arrays, each including multiple antennas. Different antenna arrays 21 may be oriented differently. Each antenna 6 may include one or more electrical traces to carry a radio frequency current. Each antenna 6 may include one or more LC-oscillators implemented by the electrical traces. Each trace may radiate electromagnetic waves with a certain beam pattern.

The BS 5 further includes a memory 17, e.g., a non-volatile memory 17. The memory 17 may store program code that can be executed by the processor 14. Executing the program code may cause the processor 14 to perform techniques with respect to the determination of a beam configuration as disclosed herein. Thus, the processor 14 and the memory 17 form a control circuitry 18.

The UE 3 includes a processor 19 and an interface 20, sometimes also referred to as frontend. The interface 20 is coupled via antenna ports (not shown in FIG. 2) with an antenna array 21 including a plurality of antennas 22. In some examples, the UE 3 may include a plurality of antenna arrays 21, each including multiple antennas. Different antenna arrays 21 may be oriented differently. Each antenna 22 may include one or more electrical traces to carry a radio frequency current. Each antenna 22 may include one or more LC-oscillators implemented by the electrical traces. Each trace may radiate electromagnetic waves with a certain beam pattern.

The UE 3 further includes a memory 23, e.g., a non-volatile memory 23. The memory 23 may store program code that can be executed by the processor 19. Executing the program code may cause the processor 19 to perform techniques with respect to the determination of a beam configuration as described herein. Thus, the processor 19 and the memory 23 form a control circuitry 12.

FIG. 2 also illustrates aspects with respect to beams 24. FIG. 2 schematically illustrates that different beams 24 (dashed lines in FIG. 2) are implemented on the wireless link 2. The different beams 24 are associated with different beam configurations. For example, to implement a certain beam 24 for DL communication, a certain DL transmit beam configuration may be selected for the antenna array 16 of the BS 5. Here, the beam configurations may generally be implemented by certain antenna weights of the antennas 6, 22 of the respective antenna array 16, 21. A selection of a given antenna array from a plurality of available antenna arrays 16, 21 can optionally be implemented by the beam configuration. Sometimes, the antenna weights are also referred to as steering vectors. Accordingly, different beam configurations may be obtained by using different amplitude and phase configurations for the various antennas 6, 22 of the respective antenna arrays 16, 21. Generally, beam configurations may be applied for transmission (transmit beam configurations) and/or reception (receive beam configurations). Furthermore, generally, beam configurations may be applied for DL communication (DL beam configurations) and/or UL communication (UL beam configurations).

Different ones of the beams 24 may have different transmission characteristics such as number of reflections, path loss, and generally transmission reliability and/or capacity. In particular, different beams 24 can have different fading profiles at the position of the respective receiver. Fading typically occurs due to destructive interference of reflected electromagnetic waves carrying the signals at the position of the receiver. By using appropriate beams 24, diversity can be provided to reduce fading. According to various examples described herein, selection of the appropriate beam 24 is facilitated.

Figure 3:
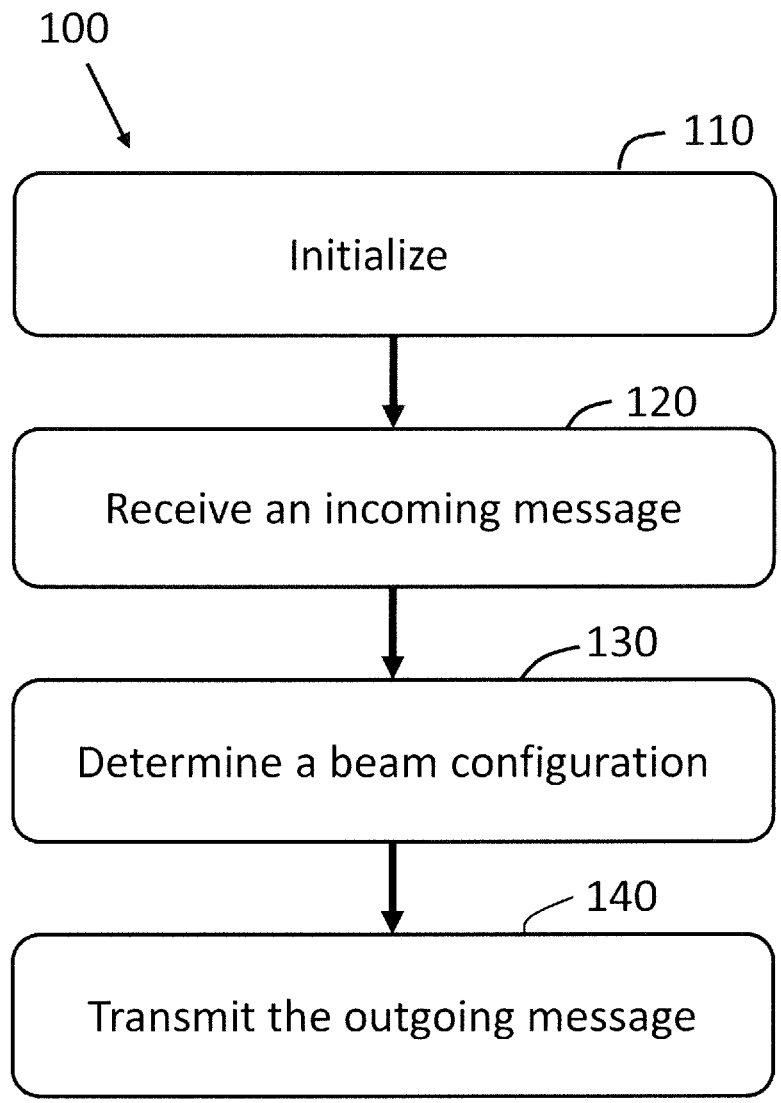
FIG. 3 represents a flowchart of a method performed by the user equipment according to various examples.

Referring to FIG. 3, a flowchart of a method 100 to be performed by the UE 3 according to various examples is depicted.

First at 110, the UE 3 is initialized. 110 is optional. Said initializing may include transitioning the UE 3 from an idle mode to an active mode and may optionally include maintaining the UE 3 in the active mode. Initializing may be induced by the BS 5, e.g., by paging as known in the art. This may be referred to as initial access.

When the UE 3 is in the active mode, the message 51 (labeled incoming message in FIG. 3) may be received by the UE 3 at 120. The message 51 may be transmitted by the BS 5. In some examples, the message 51 is a directed, beam formed message which then may propagate along one of the beams 24. Receiving the message 51 may be performed in an omnidirectional manner using an omnidirectional receive beam configuration.

In particular, it is possible that the message 51 is received by the UE 3 at a point in time when synchronization of the beam configurations between the UE 3 and the BS 5 has not yet been achieved. Here, synchronization of the beam configuration—for beam alignment—can be different from synchronization in time and/or frequency domain. For example, the message 51 may be received by the UE 3 when synchronization in time and/or frequency domain with the BS 5 has already been achieved, e.g., by synchronization signals. Therefore, it is possible that the signal-to-noise ratio of receiving the message 51 is comparably low. In order to ensure successful detection and/or decoding of the information nonetheless, it is possible that the information is encoded by the message 51 using a comparably low constellation. Typically, low constellations facilitate robust decoding even in presence of significant noise and interference.

According to various embodiments, the message 51 received by the UE 3 comprises information, e.g., corresponding to encoded data. The information may be indicative of the spatial propagation characteristic of the message 51.

As an example, said spatial propagation characteristic may refer to a trajectory along which the message 51 has been propagated from the BS 5 to the UE 3. For example, the trajectory may be defined by its origin and/or direction or orientation in space. The trajectory of the message 51 may be well approximated by a line-of-sight transmission, i.e., a straight path. Generally, the message 51 may be transmitted in an omnidirectional or directed manner.

According to one embodiment, the information may be indicative of the propagation direction of the message 51. In one example, said propagation direction may refer to a propagation direction at a certain point of time at which the message 51 is transmitted by the BS 5. According to an embodiment, the propagation direction may include at least one of an azimuth angle $\phi$ and an elevation angel $\Theta$ of the propagation direction of the message 51. According to this embodiment, the UE 3 may receive polar coordinate information regarding the propagation of the message 51. According to an embodiment, the propagation direction may include the absolute angle. A lookup table may be used. For example, a 2-bit or 3-bit lookup table may be used. For example, the absolute angle may be encoded in increments somewhere in the range of 1-20°, optionally 10°+−5°.

According to another embodiment, the information of the message 51 is indicative of a spatial propagation characteristic corresponding to an absolute position of the BS 5. This may be implemented using at least one absolute position value of the BS 5. Said at least one absolute position value may refer to an elevation of the BS 5. Further, said at least one position value may also refer to geolocation of the BS 5, e.g., defined in two or three dimensions. According to an embodiment, the information corresponds to both the elevation and the geolocation of the BS 5. In the latter case, the UE 3 may receive three-dimensional coordinate information regarding the position of the BS 5 and may therefore receive particularly accurate information regarding the position in space of the BS 5.

According to one embodiment, said receiving the message 51 by the UE 3 at 120 is part of initial access for the UE 3, e.g., a 3GPP LTE random access procedure (RACH) or Radio Resource Control (RRC) setup procedure. In this context and as an example, said initial access may refer to receiving a message 51 as part of RACH Message 2/4 by the UE 3 or as part of downlink control information (DCI), such as in response to a power-up of the UE 3 or when initially attaching to the network 13.

At 130, the UE 3 determines a beam configuration of the antennas 22 based on the information received at 120. This beam configuration is for transmitting the message 52 to the BS 5. The beam configuration helps to synchronize the beam configuration between the UE 3 and the BS 5.

In some examples, it is possible that a two-step or, generally, a multi-step approach is employed. For example, a coarse to fine determination of the beam configuration may be implemented. Generally, in such a multi-step approach, multiple messages 51 may be received in multiple iterations of 120. Based on each received message 51, a part of the beam configuration can be determined, at a respective iteration of 130. For example, initially—in a coarse determination—at least one antenna may be determined that is used for transmission, e.g., by selecting an appropriate antenna module; then—in a fine determination—antenna weights for the at least one antenna may be determined. Hence, the method 100 may include multiple iterations of 120 and 130 in a sub-loop.

As a general rule, various decision criteria can be taken into account when determining, at 130, the beam configuration.

According to one embodiment, the spatial propagation characteristic of the message 51 received by the UE 3 is used by the UE 3 in order to determine at least a part the beam configuration. As an example, the UE 3 may determine said beam configuration to correspond to a beam 24 being oriented opposite to the propagation direction of the message 51. As another example, the UE 3 may determine said beam configuration to correspond to a beam 24 aimed at the position of the BS 5, e.g., defined by the elevation and or the geolocation of the BS 5. The UE 3 may then control the antennas 22 of its antenna array 21 accordingly. As still another example, the UE 3 may determine at least one antennas from all available antennas based on the spatial propagation characteristic. For example, the particular antenna module that supports a spatial propagation characteristic reciprocal to the spatial propagation characteristic of the message 51 may be selected. This corresponds to a coarse determination of the beam configuration, because the specific antenna weights for the selected at least one antenna may yet be unknown.

According to a further embodiment, a receive beam sweep of the UE 3 is employed to determine at least a part of the beam configuration. For example, the BS 5 may perform a transmit beam sweep and the UE 3 may contemporaneously perform a receive beam sweep. Different beam configurations are activated in the transmit beam sweep and the receive beam sweep. Then, a particularly favorable beam configuration can be selected from a comparison of figures of merit, e.g., signal-to-noise, etc. For example, the particular antenna weights of the at least one antenna of an antenna module—selected in a first, coarse step based on the spatial propagation characteristic—may be determined in such a manner based on the receive beam sweep.

According to various examples, the beam configuration of the plurality of antennas 6 of the BS 5 may be determined based on a comparison between a position of the UE 3 and a position of the BS 5. For example, the relative position of the UE 3 with respect to the BS 5 may be used in order to conclude on the direction of a beam used for transmitting the message 52.

At 140, the message 52 (labeled outgoing message in FIG. 3) is then transmitted as a directed, beam-formed message to the wireless link 2 using the beam configuration. The message 52 can then reach the BS 5 along the respective beam 24.

When the message 52 is transmitted by the UE 3 at 140, synchronization of the beam configurations between the BS 5 and the UE 3 has been achieved. For this reason, it can be expected that the beam used for transmitting the message 52 is suited to deliver the message 52 to the BS 5 at comparably high signal-to-noise ratio. For this reason, it is possible to implement the message 52 encoding further information— e.g., UL control data or UL payload data—using a comparably high constellation. In particular, the constellation employed by the message 52 for encoding the respective further information may be higher than the constellation employed by the message 51 for encoding the information indicative of the spatial propagation characteristic of the message 51.

Figure 4:
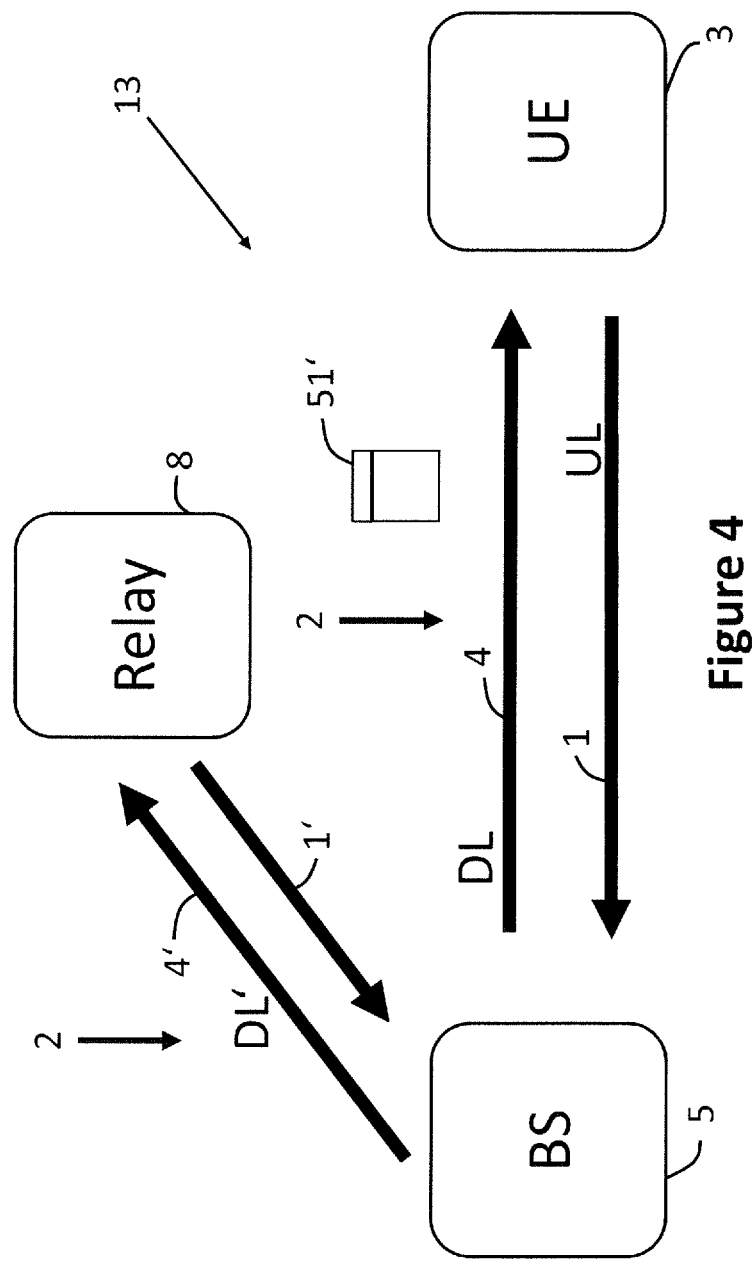
FIG. 4 schematically illustrates a network comprising a wireless link between a base station, a user equipment, and a relay according to various examples.

FIG. 4 schematically illustrates a network 13 comprising a wireless link 2 between both a) the UE 3 and the BS 5 and b) the UE 3 and a relay 8 according to various examples. Referring to such a configuration, the BS 5 may generally be connected to different devices, here the UE 3 and the relay 8. The relay 8 may offer sidelink communication to the UE 3 on a sidelink channel on the wireless link 2 (not shown in FIG. 4). A further DL channel 4' and a further UL channel 1' may be provided in between the BS 5 and the relay 8.

According to such a configuration, the UE 3 may receive a further message 51' on the wireless link 2 to from the BS 5, wherein the further message 51' comprises information which is indicative of a geolocation of the relay 8 communicating with the BS 5. According to one example, said additional information indicative of a geolocation of the relay 8 may be determined by the BS 5 using control signaling with the relay 8.

While in the example of FIG. 4 a dedicated further message 51' is transmitted from the base station 5 to the UE 3, in other examples information indicative of the geolocation of the relay 8 could also be included in the message 51.

Based on the information indicative of the geolocation of the relay 8, discovery of the relay 8 by the UE 3 or vice versa could be facilitated. Then, communication on a sidelink channel of the wireless link 4 could be implemented between the relay 8 and the UE 3 (the sidelink channel is not illustrated in FIG. 4).

While in the example of FIG. 4 the message 51' includes information indicative of the geolocation of the relay 8, in other examples, information indicative of the geolocation of other devices of the network 13 could be provided. Examples include further base stations. Information indicative of the geolocation of one or more further base stations can be helpful for handovers of the UE 3 from the serving base station 5 to a respective target base station. Communication between base stations can be implemented a backbone and is not required to recite on the wireless link 2.

Figure 5:
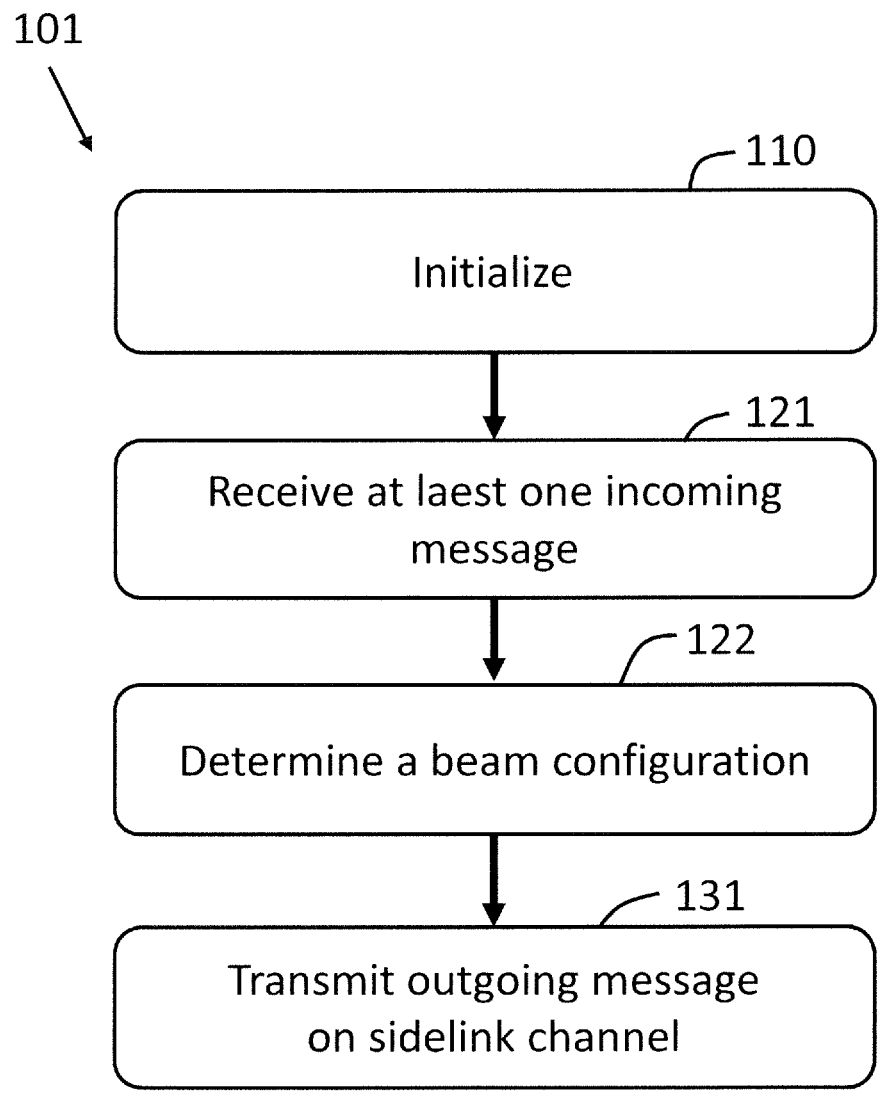
FIG. 5 represents a flowchart of a method performed by the user equipment according to various examples.

FIG. 5 represents a flowchart of a further method 101 performed by the UE 3 according to various examples. Method 101 according to FIG. 5 corresponds to a modification of method 100 according to FIG. 3. Here, the communication situation is adapted to an increased number of participants according to FIG. 4.

First at 110, initializing the UE 3 may be implemented as described with respect to FIG. 3. 110 is again optional.

At 121, one or more messages 51, 51' are received on the wireless link 2 from the BS 5. According to an embodiment, at least one message 51, 51' of said one or more messages 51, 51' includes information which is indicative of a geolocation of a relay 8 communicating with the BS 5. According to an embodiment, the message 51 and/or the further message 51' is a directed, beam-formed message.

At 122, the beam configuration is determined based on the information indicative of the geolocation of the relay 8.

At 131, the message 52 is transmitted on the wireless link to the relay 8. This is done using the beam configuration. The message 52, in this example, facilitates set up a sidelink channel between the relay 8 and the UE 3. The message 52, for example, may facilitate discovery of the relay 8 by the UE 3.

Figure 6:
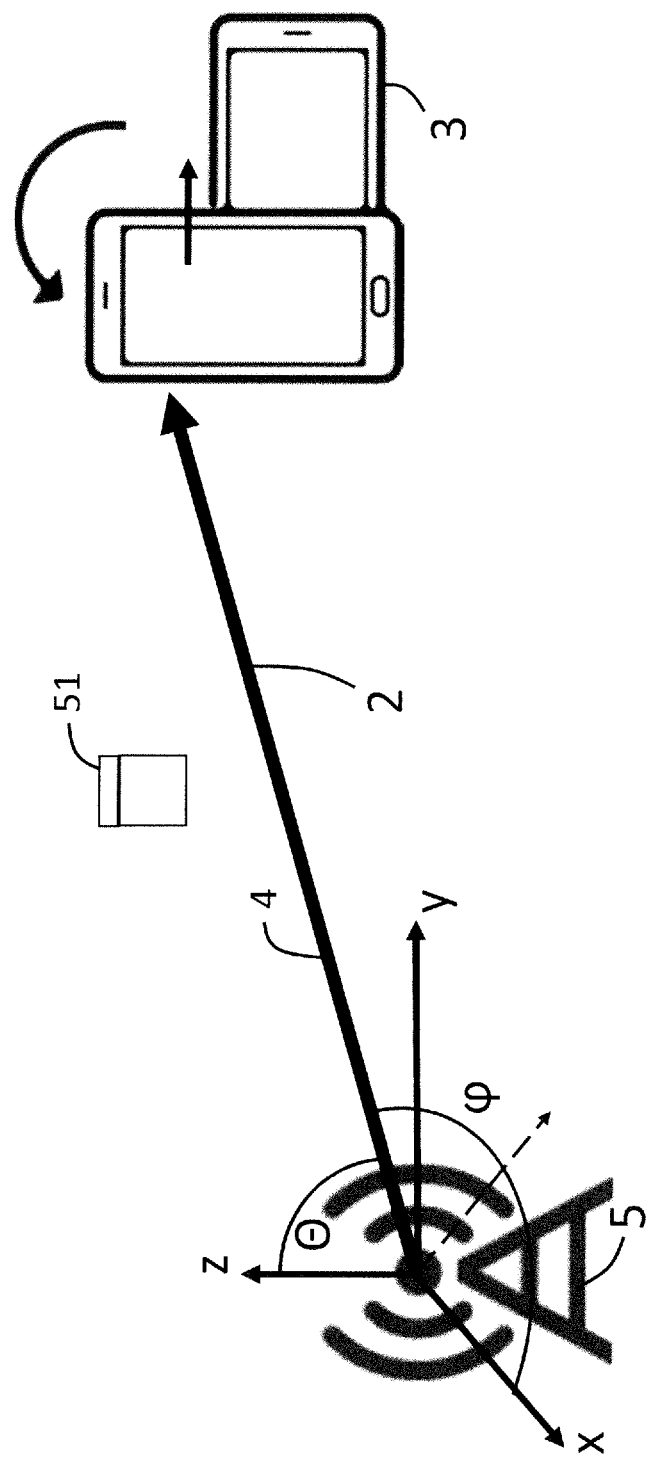
FIG. 6 schematically illustrates the user equipment and the base station moving relative to one another according to various examples.

FIG. 6 schematically illustrates the UE 3 and the BS 5 moving relative and changing orientation (arrows in FIG. 6) to one another according to various examples.

With respect to FIG. 6, a transmission source of the BS 5 is positioned in an origin of a Cartesian coordinate system described by axes x, y and z. This may be a reference frame, e.g., derived from a global coordinate system. The BS 5 may transmit the message 51 which may be received by the UE 3. According to an example depicted in FIG. 6, the message 51 comprises information indicative of its propagation direction, wherein the propagation direction of the message 51 may be determined by an azimuth angle $\phi$ and an elevation angle $\Theta$ with respect to the Cartesian coordinate system. As an example based on FIG. 6, the information indicative of a propagation direction of the first message may be: $\phi=60°$ and $\Theta=45°$. Based on such information of the spatial propagation characteristic of the message 51, it is possible to determine the beam configuration used by the UE 3 to transmit the message 52 back to the BS 5.

According to various examples and as depicted in FIG. 6, however, a relative movement in between the BS 5 and the UE 3 may occur after the message 51 is received by the UE 3. As an example, the UE 3 may change orientation and may adapt another position (cf. arrow in FIG. 6). Pertaining to such a case, a method according to the present application may additionally monitor at least one of the position and the orientation of the UE 3 and may further adapt the beam configuration based on said monitoring. Said adaptation may be performed in real-time providing for low latency.

FIG. 6 also illustrates aspects with respect to the assumption of a line-of-sight propagation of the message 51. Because reflections do not occur along the trajectory of the message 51 from the BS 5 to the UE 3, the propagation direction with which the BS 5 transmits the message is the same as the propagation direction with which the UE 3 receives the message. Therefore, in a simple scenario, it is possible to transmit the message 52 to the BS 5 using the opposing propagation direction, i.e., mirrored at the origin of the Cartesian coordinate system. Generally, it is possible that the beam configuration is determined based on the assumption of line-of-sight propagation of messages.

Figure 7:
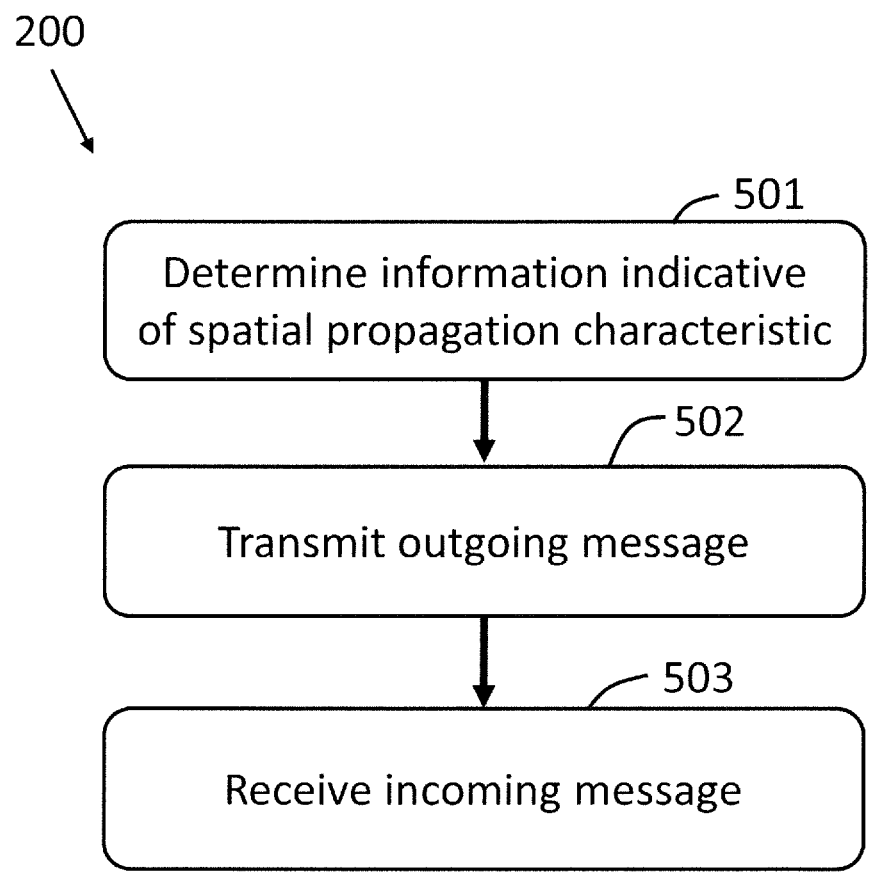
FIG. 7 represents a flowchart of a method performed by the base station according to various examples.

FIG. 7 represents a flowchart of a method 500 that may be executed by the BS 5, e.g., by the control circuitry of the BS 5.

At 501, information indicative of a spatial propagation characteristic of the message 51 (labeled outgoing message in FIG. 7) is determined. This may be done based on a beam configuration used for transmitting the message 51 at 502. Alternatively or additionally, this may be done based on knowledge on the geolocation and/or elevation of the BS 5.

For example, it would be possible that the spatial propagation characteristic of the message 51 transmitted at 502 is determined based on a geolocation and/or elevation of the UE 3. For example, from a comparison of the geolocation and/or elevation of the BS 5 with the geolocation and/or elevation of the UE 3, the directivity of the respective beam configuration used for transmitting can be determined; this can allow to conclude back on the spatial propagation characteristic of the message 51. For example, line of sight propagation may be assumed. To obtain knowledge on the geolocation and/or elevation of the UE 3, the UE 3 may transmit a further message including information indicative of at least one of the geolocation and the elevation and the BS 5 may receive the further message, e.g., prior to 501 (not illustrated in FIG. 7).

Next, at 502, the message 51 is transmitted. For example, the message 51 may be transmitted as part of a beam sweep. Here, the beam sweep may include transmission of multiple messages on multiple beams 24; each one of the multiple messages may include respective information which is indicative of the corresponding spatial propagation characteristic. For example, if the spatial propagation characteristic includes the propagation direction of the first message, messages transmitted on different beams 24 may include different information. In another example, the spatial propagation characteristic includes the geolocation of the BS 5, messages transmitted on different beams 24 may include the same information, because the origin is the same for all messages. Using a beam sweep increases the likelihood of the UE 3 successfully receiving the message 51. For example, if multiple messages are transmitted on different beams 24, the UE may perform conventional channel sensing techniques in order to identify the particular beam 24 offering the best signal-to-noise ratio. In another example, if multiple repeated messages are transmitted on the same beam 24, the UE may perform receive beam sweeping in order to identify the particular UE beam that match with beam 24 from BS. For this, receive properties—e.g., a signal level, signal fading, decoding errors, etc.—can be compared between the multiple messages. This can be taken into account when determining the beam configuration at the UE 3.

Then, at 503 the message 52 (labeled incoming message in FIG. 7) is received. For example, the message 52 may be a directed, beam-formed message transmitted by the UE 3 using a beam configuration which is determined based on the information included in the message 51 transmitted at 502.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, above various techniques have been disclosed in which a base station transmits a message comprising information indicative of the spatial propagation characteristic of said message. Hence, various techniques have been disclosed in which a DL message comprises information indicative of its spatial propagation characteristic. In other examples, it would also be possible to employ such techniques for transmitting an UL message which comprises information indicative of its spatial propagation characteristic. In still further examples, it would be possible to employ such techniques for transmitting a sidelink message which comprises information indicative of its spatial propagation characteristic.

The invention claimed is:

1. A method, comprising:
a first device receiving at least one first message on a wireless link from a second device, wherein the at least one first message comprises information indicative of a spatial propagation characteristic of the at least one first message, and wherein the information is indicative of a propagation direction of the at least one first message, determining a beam configuration of a plurality of antennas of the first device based on the information, and
the first device transmitting a directed, beam-formed second message on the wireless link using the beam configuration, wherein the information comprises an indication of an azimuth angle and an elevation angle of the propagation direction of the at least one first message.

2. The method according to claim 1, wherein the information is indicative of an elevation of the second device.

3. The method according to claim 1, wherein the information is indicative of a geolocation of the second device.

4. The method according to claim 1,
wherein the at least one first message comprises further information which is indicative of an elevation and/or a geolocation of a third device communicating with the second device,
wherein said determining of the beam configuration is further based on the further information, and
wherein the second message is transmitted to the third device.

5. The method according to claim 1,
wherein the beam configuration is determined based on a comparison between a position of the first device and a position of the second device.

6. The method according to claim 1,
wherein the first device receives the at least one first message using an omnidirectional receive beam configuration.

7. The method according to claim 1,
wherein the at least one first message is a directed, beam-formed message.

8. The method according to claim 7, further comprising:
the first device receiving at least one further first message on the wireless link from the second device, wherein the at least one further first message comprising a directed, beam-formed message,
comparing receive properties of the at least one first message and the at least one further first message,
wherein the beam configuration is further determined based on said comparing of the receive properties.

9. The method according to claim 1,
wherein said receiving the at least one first message by the first device is during initial access of the first device to a network comprising the first device and the second device.

10. The method according to claim 1, further comprising:
monitoring at least one of the position and the orientation of the first device, and
real-time adapting the beam configuration based on said monitoring.

11. The method according to claim 1,
wherein the beam configuration is determined based on an assumption of a line-of-sight propagation of messages transmitted between the first device and the second device on the wireless link.

12. The method according to claim 1,
wherein the at least one first message encodes the information using a first constellation and the second message encodes further information using a second constellation,
wherein the first constellation is lower than the second constellation.

13. The method according to claim 1,
wherein the beam configuration is indicative of at least one antenna of a plurality of antennas, and
wherein the at least one antenna is determined based on the information indicative of the spatial propagation characteristics.

14. The method according to claim 13, wherein the beam configuration is indicative of antenna weights of the at least one antenna.

15. The method according to claim 14, wherein the antenna weights are determined based on a receive beam sweep of the first device.

16. The method according to claim 13,
wherein the at least one first message comprises two or more first messages,
wherein the at least one antenna is determined based on a first one of the two or more first messages, and
wherein antenna weights are determined based on a second one of the two or more first messages.

17. The method according to claim 1, further comprising:
prior to receiving the at least one first message, the first device transmitting a further message to the second device,
wherein the further message comprises information indicative of at least one of a geolocation and an elevation of the first device.

18. A device comprising:
a control circuitry configured to receive at least one first message on a wireless link from a further device, the at least one first message comprising information indicative of a spatial propagation characteristic of the at least one first message,
wherein the information is indicative of a propagation direction of the at least one first message,
wherein the control circuitry is further configured to determine a beam configuration of a plurality of antennas of the device based on the information,
wherein the control circuitry is further configured to transmit a directed, beam-formed second message on the wireless link using the beam configuration, and
wherein the information comprises an indication of an azimuth angle and an elevation angle of the propagation direction of the at least one first message.

19. A method, comprising:
a second device transmitting at least one first message on a wireless link to a first device, the at least one first message comprising information indicative of a propagation direction of the at least one first message,
the second device receiving a directed, beam-formed message second message on the wireless link from the first device,
wherein the beam-formed second message is based on the information,
wherein the information comprises an indication of an azimuth angle and an elevation angle of the propagation direction of the at least one first message.

* * * * *